United States Patent [19]

Waghorne

[11] 4,098,677

[45] Jul. 4, 1978

[54] CATALYTIC CRACKING PROCESS WITH CO₂-STRIPPED REGENERATED CATALYST

[75] Inventor: Robert H. Waghorne, Baton Rouge, La.

[73] Assignee: Exxon Research & Engineering Co., Linden, N.J.

[21] Appl. No.: 780,247

[22] Filed: Mar. 22, 1977

[51] Int. Cl.² .......................... C10G 11/04; B01J 8/24
[52] U.S. Cl. ......................................... 208/113; 55/61;
208/120; 208/150; 208/164; 252/417; 252/418;
260/683 R
[58] Field of Search ............................ 208/113–127,
208/148, 150–151, 163–164; 260/683 R;
252/416–419

[56] References Cited

U.S. PATENT DOCUMENTS

| | | | |
|---|---|---|---|
| 2,342,856 | 2/1944 | Hall | 208/120 |
| 2,414,002 | 1/1947 | Thomas et al. | 208/164 |
| 2,429,359 | 10/1947 | Kassel | 208/150 X |
| 2,456,707 | 12/1948 | Keith | 208/150 |
| 2,457,255 | 12/1948 | McElherne | 208/150 |
| 2,463,434 | 3/1949 | Shankland | 208/151 |
| 2,755,231 | 7/1956 | Blanding et al. | 208/120 |
| 3,360,587 | 12/1967 | Adams | 260/683 R |
| 3,723,345 | 3/1973 | Reynolds | 252/373 |
| 3,844,973 | 10/1974 | Stine et al. | 252/417 |
| 4,038,038 | 7/1977 | Bunn et al. | 252/417 X |

*Primary Examiner*—Delbert E. Gantz
*Assistant Examiner*—G. E. Schmitkons
*Attorney, Agent, or Firm*—Marthe L. Gibbons

[57] ABSTRACT

A catalytic cracking process is provided in which entrained nitrogen is stripped from the regenerated cracking catalyst with a stripping gas comprising at least about 80 mole percent of carbon dioxide prior to contacting the hydrocarbonaceous feed with the regenerated catalyst.

13 Claims, No Drawings

CATALYTIC CRACKING PROCESS WITH CO$_2$-STRIPPED REGENERATED CATALYST

BACKGROUND OF THE INVENTION

1. Field of the Invention

This invention relates to an improvement in a catalytic cracking process. More particularly, it relates to stripping entrained nitrogen from regenerated cracking catalyst.

2. Description of the Prior Art

Catalytic cracking processes in which a hydrocarbonaceous oil is converted to lower boiling hydrocarbons in the presence of a cracking catalyst are well known (see, for example, *Hydrocarbon Processing*, September 1976, pages 114 to 120). Generally, at least a portion of the spent cracking catalyst is removed from the cracking zone and passed to a regeneration zone where the catalyst is contacted with an oxygen-containing gas such as air at an elevated temperature to remove the carbonaceous deposit from the catalyst and thereby regenerate the catalyst. Usually, prior to passing the spent catalyst to the regeneration zone, the spent catalyst is contacted with a stripping gas to remove adhering or entrained hydrocarbons from the catalyst. After regeneration, the regenerated catalyst is recycled to the catalytic cracking zone. When the oxygen-containing gas used in the catalyst regeneration zone is air, the regenerated catalyst particles recovered from the regeneration zone include entrained nitrogen. Recycling of the regenerated catalyst particles including the entrained nitrogen to the catalytic cracking zone in turn causes the catalytic cracking zone effluent to comprise nitrogen. Typically, the effluent of the catalytic cracking zone is separated into a normally gaseous product and a normally liquid product. The normally gaseous product comprises the C$_2$— gases (components boiling not higher than the two carbon atom-containing hydrocarbons), that is, CH$_4$, C$_2$H$_4$, C$_2$H$_6$, H$_2$ and, as contaminants, N$_2$, carbon oxides and hydrogen sulfide. All the contaminants, except nitrogen, can readily be recovered from the C$_2$— gaseous stream by conventional means, such as acid scrubbing and cryogenic separation. Nitrogen, however, cannot be readily recovered. Therefore, the C$_2$— stream is usually burned rather than being further processed.

It is known to strip a regenerated catalyst which contains entrained nitrogen with a stripping gas such as steam (see, for example, U.S. Pat. No. 3,923,686). However, steam has the disadvantage of rapidly deactivating the regenerated catalyst.

It is also known to use steam or flue gas for stripping oxygen-containing gases from a completely regenerated catalyst. Flue gas, however, contains an appreciable amount of nitrogen and is therefore not efficient for stripping nitrogen.

It has now been found that if nitrogen is stripped from the regenerated catalyst particles, with a CO$_2$-containing gas, under specified conditions, then the normally gaseous product of a catalytic cracking zone effluent is not contaminated by nitrogen and the C$_2$— stream can be used in various processes or the hydrogen component can be recovered from the C$_2$— stream for use, if desired, in hydrotreating processes.

SUMMARY OF THE INVENTION

In accordance with the invention there is provided, in a catalytic cracking process wherein a hydrocarbonaceous oil feed is contacted with a cracking catalyst under catalytic cracking conditions in a catalytic cracking zone whereby a carbonaceous deposit is formed on said catalyst and wherein said catalyst with said carbonaceous deposit is contacted with an oxygen and nitrogen containing gas in a regeneration zone to remove at least a portion of said carbonaceous deposit, said regenerated catalyst having entrained nitrogen, and wherein the regenerated catalyst is recycled to said catalytic cracking zone, the improvement which comprises: (a) contacting the regenerated catalyst having entrained nitrogen with a stripping gas comprising at least about 80 mole percent of carbon dioxide for a time sufficient to remove said entrained nitrogen from said catalyst prior to recycling the regenerated catalyst to said catalytic cracking zone, and (b) recovering from said catalytic cracking zone a C$_2$— gaseous effluent substantially free of nitrogen.

DESCRIPTION OF THE PREFERRED EMBODIMENT

The present invention is applicable to any catalytic cracking process in which a hydrocarbonaceous feed is cracked to lower hydrocarbon product in the presence of a conventional catalytic cracking catalyst in which carbon-contaminated catalyst is regenerated and in which the regenerated catalyst particles comprise entrained nitrogen. The catalytic cracking process is generally conducted at a temperature ranging from about 800° to 1100° F. and at a pressure ranging from about 0 to about 50 psig utilizing feed such as gas oil, residual oils, heavy crude oils, etc. The present invention is particularly suited for use in a fluid catalytic cracking process. Fluid catalytic cracking processes are well known, see, for example, U.S. Pat. No. 3,923,642, the teachings of which are hereby incorporated by reference. The catalyst can be any conventional catalyst used for catalytic cracking processes. The usual cracking catalyst utilized comprise siliceous material such as silica, amorphous or crystalline (zeolites) silica-alumina; silica-zirconia; silica-magnesia; etc. At least a portion of the partially deactivated (spent) cracking catalyst is removed from the cracking zone and passed to a catalyst regeneration zone. Usually any occluded or entrained hydrocarbons are stripped from the partially deactivated catalyst by contacting the spent catalyst with a conventional stripping gas prior to passing the spent catalyst to the regeneration zone, otherwise the hydrocarbons would merely be burned during regeneration. At least a portion of the regenerated catalyst is removed from the regeneration zone. The regenerated catalyst particles removed from the regeneration zone contain entrained nitrogen since nitrogen from the air was present in the regeneration zone. In accordance with the present invention, the portion of regenerated catalyst particles comprising entrained nitrogen is passed to a stripping zone in which the portion of regenerated catalyst particles is contacted with a stripping gas comprising at least about 80 mole percent of carbon dioxide, in such a way as to remove the entrained nitrogen from the particles. Utilization of a carbon dioxide-containing stripping gas produces several advantages. For example, the carbon dioxide-containing gas will not deactivate the hot regenerated catalyst as some other conventional stripping gases, such as steam, may do. Furthermore, it is more costly to vaporize water and heat it to the required temperature needed for stripping than to heat a CO$_2$-containing effluent gas.

Suitable carbon dioxide-containing gaseous mixtures useful for stripping nitrogen from the catalyst are mixtures comprising at least about 80 mole percent carbon dioxide, preferably from about 90 to 95 mole percent carbon dioxide. The gaseous mixture preferably comprises less than 5 mole percent of nitrogen, preferably less than 1 mole percent of nitrogen. Furthermore, the gaseous mixture preferably comprises less than 15 mole percent steam, more preferably not more than about 10 mole percent steam. Thus, a suitable gaseous mixture comprises more than 80 mole percent carbon dioxide, less than 5 mole percent nitrogen. A preferred mixture comprises from about 90 to about 95 mole percent carbon dioxide, less than about 1 mole percent nitrogen. Although the source of the carbon dioxide-containing stream could be any available suitable carbon dioxide-containing stream, it is particularly advantageous to use carbon dioxide-containing waste stream resulting from a steam reforming process and carbon dioxide-containing purge stream resulting from a partial oxidation process used for the production of hydrogen. Steam reforming is a well known process in which hydrocarbonaceous feedstock is converted in the presence of steam and a catalyst to a methane-rich gas or to a hydrogen-rich gas depending upon the operating conditions. Details of steam reforming processes can be found, for example, in *Hydrocarbon Processing*, April 1973, pages 118–120. A typical partial oxidation process is described in U.S. Pat. No. 3,723,345, the teachings of which are hereby incorporated by reference. For example, the partial oxidation zone may be operated at a temperature in the range of 200° to 3,000° F. while employing pressures ranging between 40 and 1,500 psig and a suitable residence time.

A typical composition of a carbon dioxide-containing waste stream resulting from a steam reforming process is given in Table I.

TABLE I

| $CO_2$-CONTAINING WASTE STREAM FROM STEAM REFORMING | |
|---|---|
| Constituent | Mole % |
| $CO_2$ | 90 |
| $H_2O$ | 10 |
| $N_2$ | nil |

A typical $CO_2$-containing purge stream resulting from a partial oxidation process used to produce hydrogen is shown in Table II.

TABLE II

| $CO_2$-CONTAINING STREAM FROM PARTIAL OXIDATION | |
|---|---|
| Constituent | Mole % |
| $CO_2$ | 90 |
| $H_2O$ | 10 |
| $H_2S$ | > 0.001 |
| $N_2$ | nil |

The regenerated catalyst is contacted with the $CO_2$-containing gaseous mixture at a temperature ranging from about 1200° to 1400° F. and a pressure ranging from about 15 to 45 psig. Preferably, the contacting in the stripping zone is a countercurrent contacting. Desirably the stripper used will have as high a length to diameter ratio as geometry and pressure balance will permit to ensure maximum gas-solids countercurrent contacting and thereby minimize the volume of required stripping gas.

After substantially all of the nitrogen has been stripped from the given portion of regenerated catalyst, the regenerated catalyst, substantially free of nitrogen is passed to a catalytic cracking zone. The vaporous effluent of the catalytic cracking zone is separated by conventional means into a normally gaseous stream and a normally liquid stream. The normally gaseous stream ($C_2$—) comprises $CH_4$, $C_2H_4$, $C_2H_6$, hydrogen, carbon oxides and hydrogen sulfide. Since this stream does not comprise nitrogen as contaminant, it is easily upgraded for use in hydrotreating processes and for other uses.

What is claimed is:

1. In a catalytic cracking process wherein a hydrocarbonaceous oil feed is contacted with a cracking catalyst under catalytic cracking conditions in a catalytic cracking zone whereby a carbonaceous deposit is formed on said catalyst and wherein said catalyst with said carbonaceous deposit is contacted with an oxygen- and nitrogen-containing gas in a regeneration zone to remove at least a portion of said carbonaceous deposit, said regenerated catalyst having entrained nitrogen, and wherein the regenerated catalyst is recycled to said catalytic cracking zone, the improvement which comprises:

(a) contacting the regenerated catalyst having entrained nitrogen with a stripping gas comprising at least about 80 mole percent of carbon dioxide for a time sufficient to remove said entrained nitrogen from said catalyst prior to recycling the regenerated catalyst to said catalytic cracking zone, and (b) recovering from said catalytic cracking zone a $C_2$— gaseous effluent substantially free of nitrogen.

2. The process of claim 1 wherein said stripping gas comprises from about 90 to about 95 mole percent carbon dioxide.

3. The process of claim 1 wherein said stripping gas comprises less than about 5 mole percent of nitrogen.

4. The process of claim 1 wherein said stripping gas comprises less than about 1 mole percent of nitrogen.

5. The process of claim 1 wherein said stripping gas comprises less than about 15 mole percent of steam.

6. The process of claim 1 wherein said stripping gas comprises not more than about 10 mole percent of steam.

7. The process of claim 1 wherein said stripping gas comprises from about 90 to about 95 mole percent of carbon dioxide and less than about 1 mole percent of nitrogen.

8. The process of claim 1 wherein said carbon dioxide-containing gaseous mixture is a stream obtained from a steam reforming process.

9. The process of claim 1 wherein said carbon dioxide-containing gaseous mixture is a stream obtained from a partial oxidation process for the production of hydrogen.

10. The process of claim 1 wherein said contacting of regenerated catalyst and stripping gas is conducted at a temperature ranging from about 1200° to about 1400° F. and at a pressure ranging from about 15 to about 45 psig.

11. The process of claim 1 wherein said $C_2$— gaseous mixture recovered from said catalytic cracking zone effluent comprises hydrogen, carbon oxides, hydrogen sulfide, $CH_4$, $C_2H_4$ and $C_2H_6$, and is substantially free of nitrogen contaminant.

12. In a catalytic cracking process wherein a hydrocarbonaceous oil feed is contacted with a cracking catalyst under catalytic cracking conditions in a catalytic cracking zone whereby a carbonaceous deposit is formed on said catalyst and wherein said catalyst with said carbonaceous deposit is contacted with an oxygen and nitrogen containing gas in a regeneration zone to remove at least a portion of said carbonaceous deposit, said regenerated catalyst having entrained nitrogen, and wherein the regenerated catalyst is recycled to said catalytic cracking zone, the improvement which comprises:

(a) contacting the regenerated catalyst having entrained nitrogen with a stripping gas comprising from about 90 to about 95 mole percent of carbon dioxide and less than about 1 mole percent nitrogen at a temperature ranging from about 1200° to about 1400° F. and at a pressure ranging from about 5 to about 45 psig for a time sufficient to remove said entrained nitrogen from said catalyst prior to recycling the regenerated catalyst to said catalytic cracking zone, and (b) recovering from said catalytic cracking zone a $C_2$ minus gaseous effluent substantially free of nitrogen.

13. The process of claim 12 wherein said stripping gas comprises not more than about 10 mole percent steam.

* * * * *